United States Patent
Deroo et al.

(10) Patent No.: US 12,398,227 B2
(45) Date of Patent: *Aug. 26, 2025

(54) POLYMER ADDITIVE COMPRISING ZWITTERIONIC MOIETIES FOR VINYLIDENE FLUORIDEPOLYMER BASED MEMBRANES

(71) Applicant: SYENSQO SA, Brussels (BE)

(72) Inventors: Sophie Deroo, Lyons (FR); Emanuele Di Nicolo, Gorla Minore (IT); Guillaume Gody, Rueil-Malmaison (FR); Marie-Pierre Labeau, Sèvres (FR); Bertrand Pavageau, Villenave d'Ornon (FR); David James Wilson, Coye-La-Foret (FR); Hamza Chouirfa, Mihaud (FR)

(73) Assignee: SYENSQO SA, Brussels (BE)

( * ) Notice: Subject to any disclaimer, the term of this patent is extended or adjusted under 35 U.S.C. 154(b) by 634 days.

This patent is subject to a terminal disclaimer.

(21) Appl. No.: 17/787,875

(22) PCT Filed: Dec. 15, 2020

(86) PCT No.: PCT/EP2020/086268
§ 371 (c)(1),
(2) Date: Jun. 21, 2022

(87) PCT Pub. No.: WO2021/122631
PCT Pub. Date: Jun. 24, 2021

(65) Prior Publication Data
US 2023/0068813 A1    Mar. 2, 2023

(30) Foreign Application Priority Data
Dec. 19, 2019   (EP) .................... 19218196

(51) Int. Cl.
*C08L 27/16* (2006.01)
*B01D 71/34* (2006.01)
(Continued)

(52) U.S. Cl.
CPC ............ *C08F 214/22* (2013.01); *B01D 71/34* (2013.01); *B01D 71/4011* (2022.08);
(Continued)

(58) Field of Classification Search
None
See application file for complete search history.

(56) References Cited

U.S. PATENT DOCUMENTS

| 2008/0045420 A1 | 2/2008 | Karagianni et al. |
| 2009/0029895 A1 | 1/2009 | Scialla et al. |

(Continued)

FOREIGN PATENT DOCUMENTS

| CN | 109663510 A * | 4/2019 | ............. B01D 71/34 |
| WO | 2008125512 A1 | 10/2008 | |

(Continued)

OTHER PUBLICATIONS

Tu, K. et al., "Preparation of enduringly antifouling PVDF membrane with compatible zwitterionic copolymer via thermally induced phase separation", Journal of Applied Polymer Science 2015, 132(7), 41362. (Year: 2015).*

(Continued)

*Primary Examiner* — Richard A. Huhn
(74) *Attorney, Agent, or Firm* — Osha Bergman Watanabe & Burton LLP

(57) ABSTRACT

The present invention pertains to composition suitable for manufacturing membranes based on vinylidene fluoride (VDF) polymers, to porous membranes thereof, to methods for their manufacture and to uses thereof, especially for the filtration of water phases. Said composition comprising (Continued)

vinylidene fluoride (VDF) polymers and polymer additives comprising zwitterionic moieties delivers outstanding hydrophilization performances of manufactured membranes.

17 Claims, 1 Drawing Sheet

(51) Int. Cl.
- *B01D 71/40* (2006.01)
- *B01D 71/42* (2006.01)
- *C08F 214/22* (2006.01)
- *C08F 218/08* (2006.01)
- *C08F 220/56* (2006.01)
- *C08F 220/58* (2006.01)
- *C08J 5/18* (2006.01)

(52) U.S. Cl.
CPC ............ *B01D 71/42* (2013.01); *C08F 218/08* (2013.01); *C08F 220/56* (2013.01); *C08F 220/585* (2020.02); *C08J 5/18* (2013.01); *C08L 27/16* (2013.01)

(56) References Cited

U.S. PATENT DOCUMENTS

| | | |
|---|---|---|
| 2010/0093874 A1 | 4/2010 | Monin et al. |
| 2010/0280169 A1 | 11/2010 | Destarac |
| 2018/0001278 A1 | 1/2018 | Alexiou et al. |

FOREIGN PATENT DOCUMENTS

| | | |
|---|---|---|
| WO | 2015070004 A1 | 5/2015 |
| WO | 2019236544 A1 | 12/2019 |

OTHER PUBLICATIONS

D. Rana, T. Matsuura—Surface Modifications for Antifouling Membranes—Chemical Reviews (2010) vol. 110, No. 4, p. 2448-2471—doi: 10.1021/cr800208y (24 pages).
Handbook of Industrial Membrane Technology . Edited by Porter. Mark C. Noyes Publications, 1990. p. 70-78 (10 pages).
K. Smolders, A.C.M.Franken—Terminology for membrane distillation—Desalination (1989) vol. 72(3), p. 249-262—10.1016/0011-9164(89)80010-4 (14 pages).
International Search Report issued for corresponding EP Application No. PCT/EP2020/086268 dated Apr. 8, 2021, (3 pages).
Written Opinion issued for corresponding EP Application No. PCT/EP2020/086268 dated Apr. 8, 2021, (6 pages).

* cited by examiner

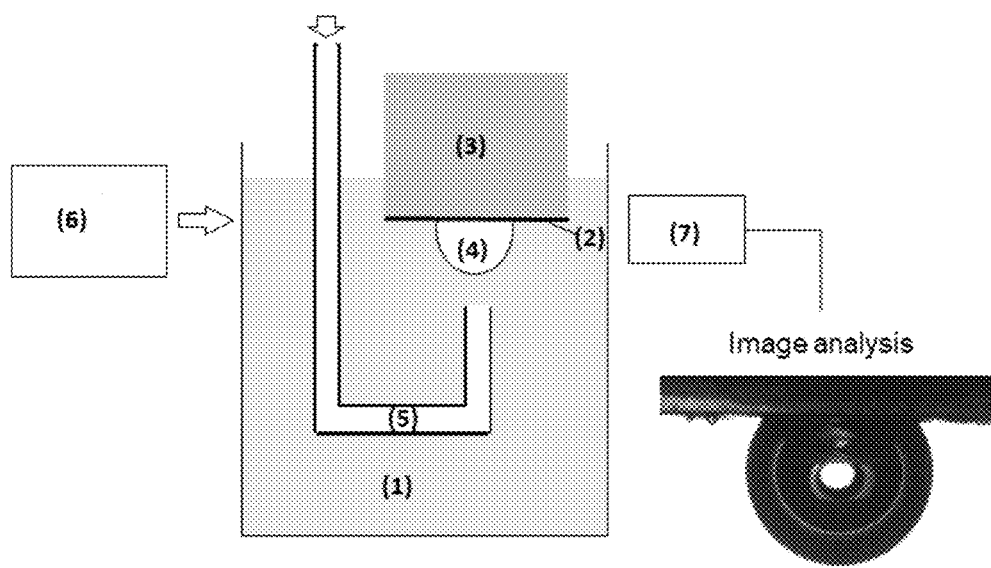

POLYMER ADDITIVE COMPRISING ZWITTERIONIC MOIETIES FOR VINYLIDENE FLUORIDEPOLYMER BASED MEMBRANES

The present invention pertains to composition suitable for manufacturing membranes based on vinylidene fluoride (VDF) polymers, to porous membranes thereof, to methods for their manufacture and to uses thereof, especially for the filtration of water phases. The invention also relates to copolymer suitable to be used as hydrophilization additive of said membranes.

BACKGROUND

Porous membrane is a thin object the key property of which is its ability to control the permeation rate of chemical species through itself. This feature is exploited in applications like separation applications (water and gas).

Fluorinated polymers are widely used in the preparation of microfiltration and ultrafiltration membranes due to their good mechanical strength, high chemical resistance and thermal stability. Among them, partially fluorinated polymers based on vinylidene fluoride (VDF) are particularly convenient in controlling porosity and morphology of said membranes. Membranes made from vinylidene fluoride polymers [polymer (VDF)] are hydrophobic in nature and therefore endowed of water repellency, low water permeability and subject to fouling of particles, proteins at their surface. Hydrophobicity impedes water to penetrate into the fluoropolymer membrane and therefore water permeability requires higher pressure and consumes more energy. Fouling reduces temporarily or permanently the flux of permeation of water through the membrane e.g. in ultrafiltration or microfiltration processes.

Capability of permeating water through porous VDF polymer membrane is generally improved by making inner surfaces of the inner pores more hydrophilic. Besides, it is generally accepted that an increase of the hydrophilicity of VDF polymer membranes offers better fouling resistance because proteins and other foulants are hydrophobic in nature.

Several strategies have been employed to make the porous VDF polymer membrane hydrophilic and thus rendering said membrane more water permeable and resistant to fouling. Among approaches that have been pursued, one can cite approaches based on grafting hydrophilic species on the surface of membranes, incorporation of hydrophilic comonomers in main chain of vinylidenefluoride polymer, incorporation of hydrophilization additives, etc. . . . These approaches are reviewed e.g. in Surface Modifications for Antifouling Membranes, Chemical Reviews, 2010, Vol. 110, No. 4, p. 2448-2471. The use of zwitterionic structures for hydrophilization of PVDF based membranes is part of these approaches and of the greatest interest.

WO 2015/070004 discloses zwitterionic containing membranes wherein a selective layer formed of a statistical copolymer comprising zwitterionic repeat units and hydrophobic repeat units such as p(MMA-s-SBMA) is disposed on a support layer formed of porous PVDF membrane. However, nothing is said neither about durability of the resulting membrane nor about their resistance to chemical aging.

Hydrophilization additives for PVDF based membranes is proposed in US 2018/0001278 which discloses comb-shaped and random zwitterionic copolymers (e.g. p(MMA-r-SBMA)) useful to enhance hydrophilicity of PVDF membranes. Resulting additivated PVDF membranes show good resistance against fouling and improved permeability when compared to PVDF membranes. However, to obtain such results, a relatively high amount of zwitterionic additive, that can impair mechanical, chemical resistance of the PVDF membrane as well as its economical attractiveness, is required.

There is need to develop highly permeable porous membrane, with controlled pores size and demonstrating antifouling behaviour. Moreover, said membrane should show high thermal and chemical stabilities which can ensure durable properties. There is also a need for additives, having high thermal and chemical stabilities, capable of hydrophilizing PVDF membranes into which they are dispersed. Additionally, these additives have to be easily and durably incorporated in the vinylidenefluoride polymer membrane in order to enhance their hydrophilicity, water permeability and anti-fouling behaviour on the long term without impairing inherent properties of vinylidenefluoride polymers which are, high mechanical, thermal and chemical properties. Finally, the additives have to be very efficient hydrophilization agents in order to be used sparingly, thus avoiding any detrimental effect du to their presence in too large amount on the mechanical, thermal and chemical resistance of the porous PVDF membrane.

SUMMARY OF INVENTION

All this needs and more are fulfilled by a first aspect of the invention which relates to a composition [composition (C)] comprising:
- at least one vinylidene fluoride (VDF) polymer [polymer (VDF)], and
- at least one polymer [polymer (N-ZW)] comprising zwitterionic recurring units derived from at least one ethylenically unsaturated monomer having at least two ionic groups, at least one of them being a cationic group [group (C+)] and at least one of them being an anionic group [group (A−)], and further comprising at least one hydroxyl group [units ($R_{ZW}$)].

A second aspect of the invention relates to a method for manufacturing a porous membrane, said method comprising:
- step (i): preparing a composition (C);
- step (ii): processing the composition provided in step (i) thereby providing a film; and,
- step (iii): processing the film provided in step (ii), generally including contacting the film with a non-solvent medium [medium (NS)], thereby providing a porous membrane.

A third aspect of the invention relates to a porous membrane comprising:
- at least one vinylidene fluoride polymer [polymer (VDF)], and
- at least one polymer [polymer (N-ZW)] comprising zwitterionic recurring units derived from at least one ethylenically unsaturated monomer having at least two ionic groups, at least one of them being a cationic group [group (C+)] and at least one of them being an anionic group [group (A−)], and further comprising at least one hydroxyl group [units ($R_{ZW}$)].

Said porous membrane can be obtained from the composition (C) as above described and manufactured by the method as above described.

A fourth aspect of the invention relates to a method of separating an aqueous medium, said method comprising contacting the aqueous medium with a porous membrane as above described.

A fifth aspect of the invention relates to a copolymer (N-ZW) comprising zwitterionic recurring units ($R_{ZW}$) derived from 3-((3-acrylamidopropyl)dimethylammonio)-2-hydroxypropane-1-sulfonate (AHPS) and recurring units ($R_N$) derived from at least one monomer selected from the list consisting of alkyl (meth)acrylates, vinyl acetate and N,N-dimethyl acrylamide. Said copolymer is suitable to be used in composition (C) for manufacturing a membrane as described above by the method as described above.

The Applicant has surprisingly found that the composition (C) as detailed above, is particularly effective for being used in the manufacture of membranes, delivering outstanding permeability performances in aqueous media filtration and separation processes, while still being compatible with typical water-induced coagulation processes typical of membrane manufacture.

The Polymer (VDF)

The expression "vinylidene fluoride polymer" and "polymer (VDF)" are used, within the frame of the present invention for designating polymers comprising recurring units derived from vinylidene fluoride, generally as major recurring units components. So, polymer (VDF) is generally a polymer essentially made of recurring units, more that 50% by moles of said recurring units being derived from vinylidene fluoride (VDF).

Polymer (VDF) may further comprise recurring units derived from at least one fluorinated monomer different from VDF and/or may further comprise recurring units derived from a fluorine-free monomer (also referred to as "hydrogenated monomer"). The term "fluorinated monomer" is hereby intended to denote an ethylenically unsaturated monomer comprising at least one fluorine atom. The fluorinated monomer may further comprise one or more other halogen atoms (Cl, Br, I).

In particular, polymer (VDF) is generally selected among polyaddition polymers comprising recurring units derived from VDF and, optionally, recurring units derived from at least one ethylenically unsaturated monomer comprising fluorine atom(s) different from VDF, which is generally selected from the group consisting of:
(a) $C_2$-$C_8$ perfluoroolefins such as tetrafluoroethylene (TFE), hexafluoropropylene (HFP), perfluoroisobutylene;
(b) hydrogen-containing $C_2$-$C_8$ fluoroolefins different from VDF, such as vinyl fluoride (VF), trifluoroethylene (TrFE), hexafluoroisobutylene (HFIB), perfluoroalkyl ethylenes of formula $CH_2$=$CH$—$R_{f1}$, wherein $R_{f1}$ is a $C_1$-$C_6$ perfluoroalkyl group;
(c) $C_2$-$C_8$ chloro- and/or bromo-containing fluoroolefins such as chlorotrifluoroethylene (CTFE);
(d) perfluoroalkylvinylethers (PAVE) of formula $CF_2$=$CFOR_{f1}$, wherein $R_{f1}$ is a $C_1$-$C_6$ perfluoroalkyl group, such as $CF_3$ (PMVE), $C_2F_5$ or $C_3F_7$;
(e) perfluorooxyalkylvinylethers of formula $CF_2$=$CFOX_0$, wherein $X_0$ is a a $C_1$-$C_{12}$ perfluorooxyalkyl group comprising one or more than one ethereal oxygen atom, including notably perfluoromethoxyalkylvinylethers of formula $CF_2$=$CFOCF_2OR_{f2}$, with $R_{f2}$ being a $C_1$-$C_3$ perfluoro(oxy)alkyl group, such as —$CF_2CF_3$, —$CF_2CF_2$—O—$CF_3$ and —$CF_3$; and
(f) (per)fluorodioxoles of formula:

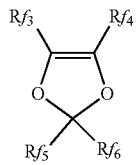

wherein each of $R_{f3}$, $R_{f4}$, $R_{f5}$ and $R_{f6}$, equal to or different from each other, is independently a fluorine atom, a $C_1$-$C_6$ perfluoro(oxy)alkyl group, optionally comprising one or more oxygen atoms, such as —$CF_3$, —$C_2F_5$, —$C_3F_7$, —$OCF_3$ or —$OCF_2CF_2OCF_3$.

The vinylidene fluoride polymer [polymer (VDF)] is preferably a polymer comprising:
(a') at least 60% by moles, preferably at least 75% by moles, more preferably 85% by moles of recurring units derived from vinylidene fluoride (VDF);
(b') optionally from 0.1 to 30%, preferably from 0.1 to 20%, more preferably from 0.1 to 15%, by moles of recurring units derived from a fluorinated monomer different from VDF; and
(c') optionally from 0.1 to 10%, by moles, preferably 0.1 to 5% by moles, more preferably 0.1 to 1% by moles of recurring units derived from one or more hydrogenated monomer(s),
all the aforementioned % by moles being referred to the total moles of recurring units of the polymer (VDF).

The said fluorinated monomer is advantageously selected in the group consisting of vinyl fluoride ($VF_1$); trifluoroethylene ($VF_3$); chlorotrifluoroethylene (CTFE); 1,2-difluoroethylene; tetrafluoroethylene (TFE); hexafluoropropylene (HFP); perfluoro(alkyl)vinyl ethers, such as perfluoro(methyl)vinyl ether (PMVE), perfluoro(ethyl) vinyl ether (PEVE) and perfluoro(propyl)vinyl ether (PPVE); perfluoro(1,3-dioxole); perfluoro(2,2-dimethyl-1,3-dioxole) (PDD). Preferably, the possible additional fluorinated monomer is chosen from chlorotrifluoroethylene (CTFE), hexafluoroproylene (HFP), trifluoroethylene (VF3) and tetrafluoroethylene (TFE).

The choice of the said hydrogenated monomer(s) is not particularly limited; alpha-olefins, (meth)acrylic monomers, vinyl ether monomers, styrenic mononomers may be used; nevertheless, to the sake of optimizing chemical resistance, embodiment's wherein the polymer (F) is essentially free from recurring units derived from said hydrogenated comonomer(s) are preferred.

Accordingly, the vinylidene fluoride polymer [polymer (VDF)] is more preferably a polymer consisting essentially of:
(a') at least 60% by moles, preferably at least 75% by moles, more preferably 85% by moles of recurring units derived from vinylidene fluoride (VDF);
(b') optionally from 0.1 to 30%, preferably from 0.1 to 20%, more preferably from 0.1 to 15% by moles of a fluorinated monomer different from VDF; said fluorinated monomer being preferably selected in the group consisting of vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures therefrom, all the aforementioned % by moles being referred to the total moles of recurring units of the polymer (VDF).

Defects, end chains, impurities, chains inversions or branchings and the like may be additionally present in the polymer (VDF) in addition to the said recurring units, without these components substantially modifying the behaviour and properties of the polymer (VDF).

As non-limitative examples of polymers (VDF) useful in the present invention, mention can be notably made of homopolymers of VDF, VDF/TFE copolymers, VDF/TFE/HFP copolymers, VDF/TFE/CTFE copolymers, VDF/TFE/TrFE copolymers, VDF/CTFE copolymers, VDF/HFP copolymers, VDF/TFE/HFP/CTFE copolymers and the like.

VDF homopolymers are particularly advantageous for being used as polymer (VDF) in the composition (C).

The melt index of the polymer (VDF) is advantageously at least 0.01, preferably at least 0.05, more preferably at least 0.1 g/10 min and advantageously less than 50, preferably less than 30, more preferably less than 20 g/10 min, when measured in accordance with ASTM test No. 1238, run at 230° C., under a piston load of 2.16 kg.

The melt index of the polymer (VDF) is advantageously at least 0.1, preferably at least 1, more preferably at least 5 g/10 min and advantageously less than 70, preferably less than 50, more preferably less than 40 g/10 min, when measured in accordance with ASTM test No. 1238, run at 230° C., under a piston load of 5 kg.

The melt index of the polymer (VDF) is advantageously at least 0.1, preferably at least 0.5, more preferably at least 1 g/10 min and advantageously less than 30, preferably less than 20, more preferably less than 10 g/10 min, when measured in accordance with ASTM test No. 1238, run at 230° C., under a piston load of 21.6 kg.

The polymer (VDF) has advantageously a melting point ($T_m$) advantageously of at least 120° C., preferably at least 125° C., more preferably at least 130° C. and of at most 190° C., preferably at most 185° C., more preferably at most 180° C., when determined by DSC, at a heating rate of 10° C./min, according to ASTM D 3418.

Polymer (N-ZW) Comprising Zwitterionic Recurring Units

Composition (C) generally comprises at least one polymer [polymer (N-ZW)] comprising zwitterionic recurring units derived from at least one ethylenically unsaturated monomer having at least two ionic groups, at least one of them being a cationic group [group (C+)] and at least one of them being an anionic group [group (A−)], and further comprising at least one hydroxyl group [units ($R_{ZW}$)].

Generally, zwitterionic recurring units ($R_{ZW}$) are derived from at least one ethylenically unsaturated monomer that is neutral in overall charge but contains a number of group (C+) equal to the number of group (A−) and further comprising at least one hydroxyl group. The cationic charge(s) may be contributed by at least one onium or inium cation of nitrogen, such as ammonium, pyridinium and imidazolinium cation; phosphorus, such as phosphonium; and/or sulfur, such as sulfonium. The anionic charge(s) may be contributed by at least one carbonate, sulfonate, phosphate, phosphonate, phosphinate or ethenolate anion, and the like. Suitable zwitterionic monomers include, but are not limited to, betaine monomers, which are zwitterionic and comprise an onium atom that bears no hydrogen atoms and that is not adjacent to the anionic atom.

In some embodiments, units ($R_{ZW}$) are derived from at least one monomer selected from the list consisting of
a) hydroxyalkyl sulfonates or phosphonates of dialkylammonium alkyl acrylates or methacrylates, acrylamido or methacrylamido, typically:
  sulfohydroxypropyldimethylammonioethyl acrylate,
  sulfohydroxypropyldimethylammonioethyl methacrylate,
  sulfohydroxypropyldimethylammoniopropyl acrylamide,
  sulfohydroxypropyldimethylammoniopropyl methacrylamide;
b) heterocyclic betaine monomers comprising at least one hydroxyl group, typically
  sulfobetaines derived from piperazine,
  sulfobetaines derived from 2-vinylpyridine and 4-vinylpyridine,
  sulfobetaines derived from imidazolium, and
c) hydroxyalkyl sulfonates or phosphonates of dialkylammonium alkyl styrenes.

In some preferred embodiments, units ($R_{ZW}$) are derived from at least one monomer selected from the list consisting of

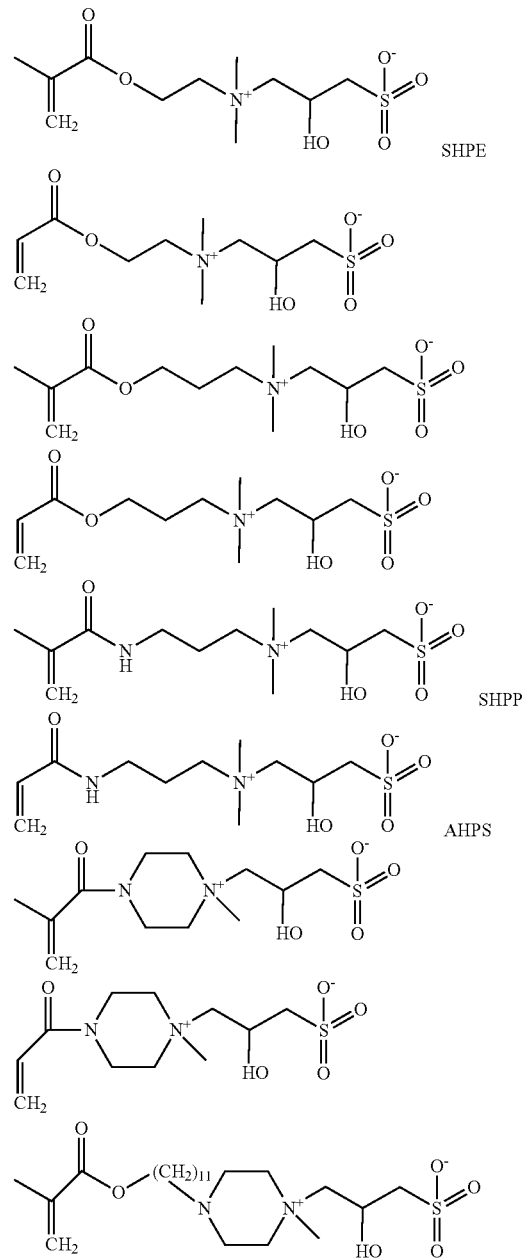

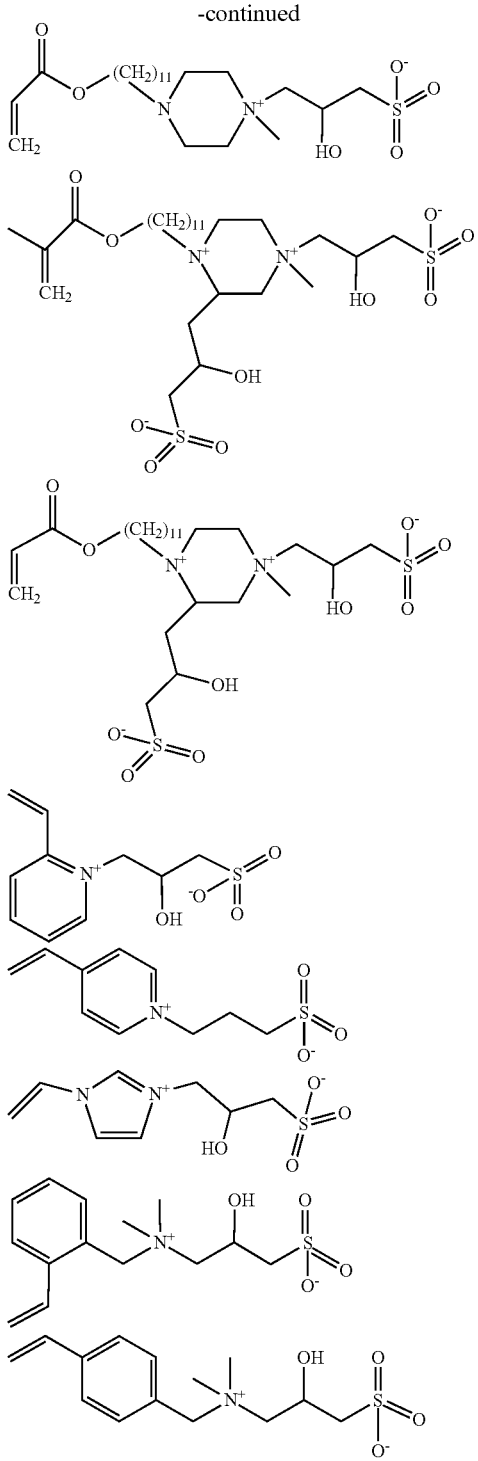

In preferred embodiments, units ($R_{ZW}$) are derived from at least one monomer selected from the list consisting of
sulfohydroxypropyldimethylammonioethyl acrylate,
sulfohydroxypropyldimethylammonioethyl methacrylate (SHPE),
sulfohydroxypropyldimethylammoniopropyl acrylamide (AHPS), and
sulfohydroxypropyldimethylammoniopropyl methacrylamide (SHPP).

In more preferred embodiments, units ($R_{ZW}$) are derived from sulfohydroxypropyldimethylammoniopropyl acrylamide (AHPS).

In some embodiments, polymer (N-ZW) further comprises recurring units different from units ($R_{ZW}$), derived from at least one ethylenically unsaturated monomer deprived of ionisable groups [units ($R_N$)].

In some embodiments, units ($R_N$) are derived from at least one monomer selected from the list consisting of methyl methacrylate, ethyl methacrylate, butyl methacrylate, methyl acrylate, ethyl acrylate, butyl acrylate, vinyl acetate and N,N-dimethylacrylamide [units ($R_{N-1}$)]. Preferably, units ($R_{N-1}$) are derived from methyl methacrylate, ethyl methacrylate or mixture thereof. More preferably, units ($R_{N-1}$) are derived from methyl methacrylate.

In some other embodiments, units ($R_N$) are derived from at least one monomer selected from the list consisting of 2-hydroxyethyl methacrylate (HEMA), hydroxypropyl methacrylate, 2-hydroxyethyl acrylate (HEA), hydroxypropyl acrylate, 4-hydroxybutyl acrylate, poly(ethylene glycol) methacrylate (PEGMA), poly(ethylene glycol) methyl ether methacrylate (mPEGMA), poly(ethylene glycol) ethyl ether methacrylate, poly(ethylene glycol) methyl ether acrylate and poly(ethylene glycol) ethyl ether acrylate [units ($R_{N-2}$)]. Preferably, units ($R_{N-2}$) are derived from 2-hydroxyethyl methacrylate (HEMA), hydroxypropyl methacrylate or mixture thereof. More preferably, units ($R_{N-2}$) are derived from 2-hydroxyethyl methacrylate (HEMA).

Still in some other embodiments, units ($R_N$) are derived from at least one monomer selected from the list consisting of methyl methacrylate, ethyl methacrylate, butyl methacrylate, methyl acrylate, ethyl acrylate, butyl acrylate, vinyl acetate and N,N-dimethylacrylamide [units ($R_{N-1}$)] and from at least one monomer selected from the list consisting of 2-hydroxyethyl methacrylate (HEMA), hydroxypropyl methacrylate, 2-hydroxyethyl acrylate (HEA), hydroxypropyl acrylate, 4-hydroxybutyl acrylate, poly(ethylene glycol) methacrylate (PEGMA), poly(ethylene glycol) methyl ether methacrylate (mPEGMA), poly(ethylene glycol) ethyl ether methacrylate, poly(ethylene glycol) methyl ether acrylate and poly(ethylene glycol) ethyl ether acrylate [units ($R_{N-2}$)]. Preferably, units ($R_{N-1}$) are derived from methyl methacrylate, ethyl methacrylate or mixture thereof and units ($R_{N-2}$) are derived from 2-hydroxyethyl methacrylate (HEMA), hydroxypropyl methacrylate or mixture thereof. More preferably, units ($R_{N-1}$) are derived from methyl methacrylate and units ($R_{N-2}$) are derived from 2-hydroxyethyl methacrylate (HEMA).

In some preferred embodiments, the polymer (N-ZW) of the present disclosure comprises recurring units ($R_{ZW}$) derived from (AHPS), (SHPP), (SHPE) or mixtures thereof and recurring units ($R_{N-1}$) derived from methyl methacrylate.

In some other preferred embodiments, the polymer (N-ZW) of the present disclosure comprises recurring units ($R_{ZW}$) derived from (AHPS) and recurring units ($R_{N-1}$) derived from methyl methacrylate.

Still in some other preferred embodiments, the polymer (N-ZW) of the present disclosure comprises recurring units ($R_{ZW}$) derived from (AHPS), recurring units ($R_{N-1}$) derived from methyl methacrylate and recurring units ($R_{N-2}$) derived from 2-hydroxyethyl methacrylate (HEMA).

The polymer (N-ZW) of the composition (C) according to the present disclosure generally comprises from 0.1 to 30% by moles, preferably from 0.1 to 20% by moles, more preferably from 0.1 to 7% by moles and even more preferably from 0.1 to 5% by moles of units ($R_{ZW}$), with respect to the total moles of recurring units of polymer (N-ZW).

Besides, the polymer (N-ZW) of the composition (C) according to the present disclosure generally comprises 70% or more by moles, preferably 80% or more by moles, more preferably 90% or more by moles and even more preferably 95% or more by moles of units ($R_N$), with respect to the total moles of recurring units of polymer (N-ZW).

When recurring units ($R_{N-1}$) and recurring units ($R_{N-2}$) are present, polymer (N-ZW) generally comprises from 0.1 to 50% by moles, preferably from 0.1 to 40% by moles, more preferably from 0.1 to 30% by moles and even more preferably from 0.1 to 20% by moles of recurring units ($R_{ZW}$) and ($R_{N-2}$), with respect to the total moles of recurring units of polymer (N-ZW).

Polymer (N-ZW) according to the invention is a homopolymer or a copolymer. It is preferably a copolymer comprising recurring units ($R_{ZW}$) and recurring units ($R_N$). When it is a copolymer, it is a block copolymer, a branched copolymer or a statistical copolymer. Good results were obtained with polymer (N-ZW) being a statistical copolymer.

Unless otherwise indicated, when molar mass is referred to, the reference will be to the weight-average molar mass, expressed in g/mol. The latter can be determined by gel permeation chromatography (GPC) with light scattering detection (DLS or alternatively MALLS) or refractive index detection, with an aqueous eluent or an organic eluent (for example dimethylacetamide, dimethylformamide, and the like), depending on the polymer (N-ZW). There is no particular limitation to the molar mass of the polymer (N-ZW). However, the weight-average molar mass (Mw) of the polymer (N-ZW) is in the range of from about 5,000 to about 3,000,000 g/mol, typically from about 8000 to about 1,000,000, g/mol, more typically from about 10,000 to 500,000 g/mol, even more typically 20,000 to 200,000 g/mol.

The polymer (N-ZW) of the present disclosure may be obtained by any polymerization process known to those of ordinary skill. For example, the polymer (N-ZW) may be obtained by radical polymerization or copolymerization or controlled radical polymerization in aqueous solution, in dispersed media, in organic solution or in organic/water solution (miscible phase).

The ethylenically unsaturated monomer deprived of ionisable groups from which are derived units ($R_N$) may be obtained from commercial sources.

The ethylenically unsaturated monomer having at least two ionic groups, at least one of them being a cationic group [group (C+)] and at least one of them being an anionic group [group (A−)], and further comprising at least one hydroxyl group from which are derived units ($R_{ZW}$) may be obtained from commercial sources or synthesized according to methods known to those of ordinary skill in the art.

Suitable ethylenically unsaturated monomer from which are derived units ($R_{ZW}$) may be obtained by reaction of sodium 3-chloro-2-hydroxypropane-1-sulfonate (CHPSNa) with ethylenically unsaturated monomer bearing tertiary amino group, as described in US20080045420 for the synthesis of SHPP, starting from dimethylaminopropylmethacrylamide according to the reaction scheme:

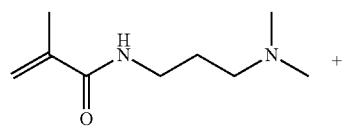

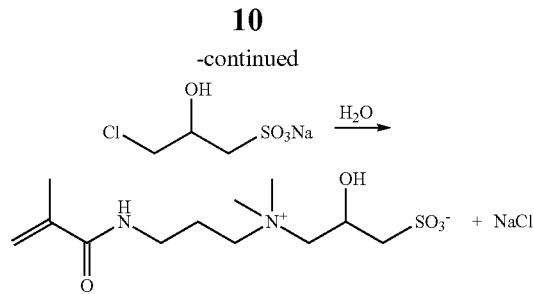

Other ethylenically unsaturated monomers bearing tertiary amino group may be involved in reaction with CHPSNa to obtain suitable ethylenically unsaturated monomers from which are derived units ($R_{ZW}$):

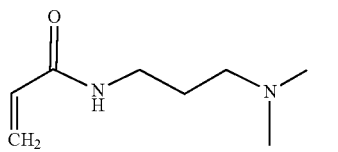

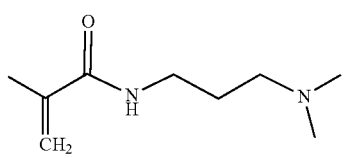

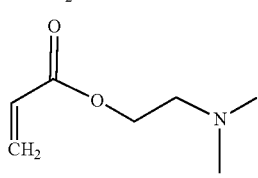

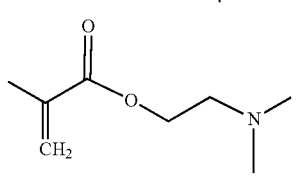

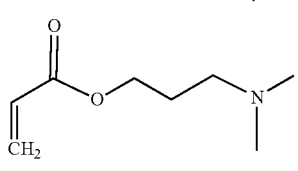

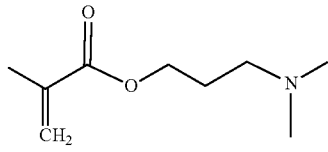

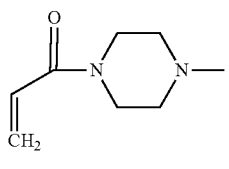

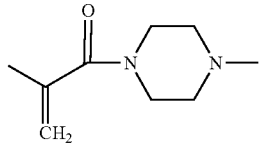

-continued

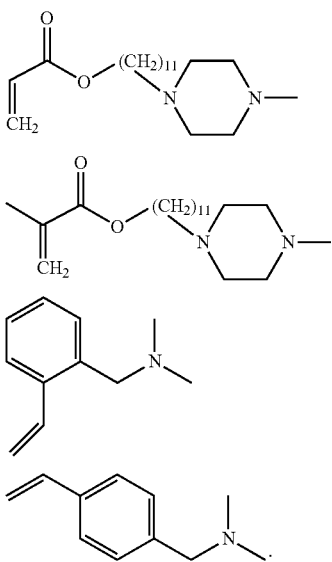

Suitable ethylenically unsaturated monomer from which are derived units ($R_{ZW}$) may be also obtained by reaction of sodium 3-chloro-2-hydroxypropane-1-sulfonate (CHPSNa) with ethylenically unsaturated monomer bearing pyridine or imidazole group:

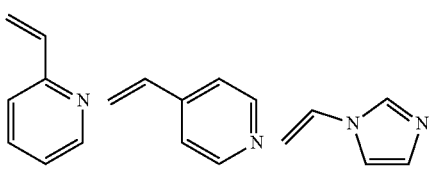

The expression "derived from" which puts recurring units (RZW) in connection with an ethylenically unsaturated monomer is intended to define both recurring units (RZW) directly obtained from polymerizing the said ethylenically unsaturated monomer, and the same recurring units (RZW) obtained by modification of an existing polymer.

Accordingly, recurring units ($R_{ZW}$) may be obtained by modification of a polymer, referred to as a precursor polymer, comprising recurring units bearing tertiary amino groups through the reaction with sodium 3-chloro-2-hydroxypropane-1-sulfonate (CHPSNa). Similar modification was described in WO2008125512 with sodium 3-chloropropane-1-sulfonate in place of CHPSNa:

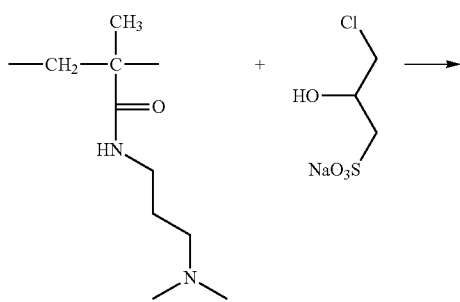

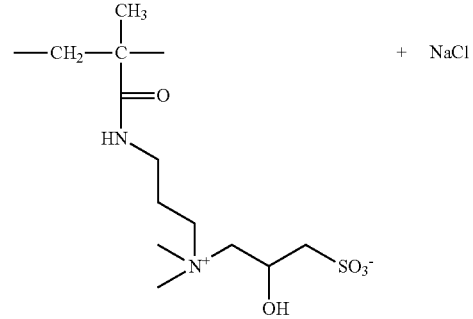

Similarly, recurring units ($R_{ZW}$) may be obtained by modification of a polymer, referred to as a precursor polymer, comprising recurring units bearing tertiary amino groups, pyridine groups, imidazole group or mixtures thereof through the reaction with sodium 3-chloro-2-hydroxypropane-1-sulfonate (CHPSNa).

As polymer (N-ZW) is used as an additive for polymer (VDF), the polymer (VDF) is generally present in predominant amount over polymer (N-ZW) in composition (C). Generally the weight ratio polymer (N-ZW)/polymer (VDF) is of at least 1/99 wt/wt, preferably at least 3/97 wt/wt, more preferably at least 5/95 wt/wt and/or it is less than 50/50 wt/wt, preferably less than 40/60 wt/wt, preferably less than 30/70 wt/wt.

Composition (C) may optionally comprise at least one further ingredient. Said further ingredient is preferably selected in the group consisting of non-solvents (water, alcohols . . . ), co-solvents (e.g. ketones), pore forming agents, nucleating agents, fillers, salts, surfactants.

When used, pore forming agents are typically added to the composition (C) in amounts usually ranging from 1% to 30% by weight, preferably from 2% to 20% by weight, based on the total weight of the composition (C). Suitable pore forming agents are for instance polyvinyl alcohol (PVA), polyvinyl-pyrrolidone (PVP) and polyethyleneglycol (PEG).

When used, salts are typically added to the composition (C) in amounts usually ranging from 0.5% to 20% by weight, preferably from 1% to 10% by weight, based on the total weight of the composition (C). Suitable salts are for instance NaCl, LiCl, $LiClO_4$ and $LiCF_3SO_3$.

Liquid Medium

In some embodiments, composition (C) further comprises at least one liquid medium [medium (L)] comprising at least one organic solvent [composition ($C^L$)].

The term "solvent" is used herein in its usual meaning, that is it indicates a substance capable of dissolving another substance (solute) to form an uniformly dispersed mixture at the molecular level. In the case of a polymeric solute, it is common practice to refer to a solution of the polymer in a solvent when the resulting mixture is transparent and no phase separation is visible in the system. Phase separation is taken to be the point, often referred to as "cloud point", at which the solution becomes turbid or cloudy due to the formation of polymer aggregates.

Generally, in composition ($C^L$), medium (L) comprises at least one solvent (S) for polymer (VDF).

The medium (L) typically comprises at least one organic solvent selected from the group comprising:
- aliphatic hydrocarbons including, more particularly, the paraffins such as, in particular, pentane, hexane, heptane, octane, nonane, decane, undecane, dodecane or cyclohexane, and naphthalene and aromatic hydrocarbons and more particularly aromatic hydrocarbons such as, in particular, benzene, toluene, xylenes, cumene, petroleum fractions composed of a mixture of alkylbenzenes;

aliphatic or aromatic halogenated hydrocarbons including more particularly, perchlorinated hydrocarbons such as, in particular, tetrachloroethylene, hexachloroethane; partially chlorinated hydrocarbons such as dichloromethane, chloroform, 1,2-dichloroethane, 1,1,1-trichloroethane, 1,1,2,2-tetrachloroethane, pentachloroethane, trichloroethylene, 1-chlorobutane, 1,2-dichlorobutane, monochlorobenzene, 1,2-dichlorobenzene, 1,3-dichlorobenzene, 1,4-dichlorobenzene, 1,2,4-trichlorobenzene or mixture of different chlorobenzenes;

aliphatic, cycloaliphatic or aromatic ether oxides, more particularly, diethyl oxide, dipropyl oxide, diisopropyl oxide, dibutyl oxide, methyltertiobutyl ether, dipentyl oxide, diisopentyl oxide, ethylene glycol dimethyl ether, ethylene glycol diethyl ether, ethylene glycol dibutyl ether benzyl oxide; dioxane, tetrahydrofuran (THF);

dimethylsulfoxide (DMSO);

glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether;

glycol ether esters such as ethylene glycol methyl ether acetate, ethylene glycol monoethyl ether acetate, ethylene glycol monobutyl ether acetate;

alcohols, including polyhydric alcohols, such as methyl alcohol, ethyl alcohol, diacetone alcohol, ethylene glycol;

ketones such as acetone, methylethylketone, methylisobutyl ketone, diisobutylketone, cyclohexanone, isophorone;

linear or cyclic esters such as isopropyl acetate, n-butyl acetate, methyl acetoacetate, dimethyl phthalate, γ-butyrolactone;

linear or cyclic carboxamides such as N,N-dimethylacetamide (DMAc), N,N-diethylacetamide, dimethylformamide (DMF), diethylformamide or N-methyl-2-pyrrolidone (NMP);

organic carbonates for example dimethyl carbonate, diethyl carbonate, dipropyl carbonate, dibutyl carbonate, ethylmethyl carbonate, ethylene carbonate, vinylene carbonate;

phosphoric esters such as trimethyl phosphate, triethyl phosphate (TEP);

ureas such as tetramethylurea, tetraethylurea;

methyl-5-dimethylamino-2-methyl-5-oxopentanoate (commercially available under the tradename Rhodialsov Polarclean®).

The following are particularly preferred: N-methyl-pyrrolidone (NMP), dimethyl acetamide (DMAc), dimethylformamide (DMF), dimethylsulfoxide (DMSO), tetrahydrofuran (THF), methyl-5-dimethylamino-2-methyl-5-oxopentanoate (commercially available under the tradename Rhodialsov Polarclean®) and triethylphosphate (TEP).

The medium (L) may further comprise at least one additional liquid component different from solvent (S) (or in other terms, a non-solvent).

Said additional liquid component, which does not have ability to dissolve polymer (VDF), may be added to composition ($C^L$), in an amount generally below the level required to reach the cloud point, typically in amount of from 0.1% to 40% by weight, preferably in an amount of from 0.1% to 20% by weight, based on the total weight of medium (L) of the composition ($C^L$).

Without being bound by this theory, it is generally understood that the addition of a non-solvent to composition ($C^L$) could be advantageously beneficial in increasing rate of demixing/coagulation in processes for manufacturing porous membranes, and/or for promoting coagulation by removal of solvent (S) by evaporation.

Generally, the composition ($C^L$) comprises an overall amount of polymer (N-ZW) and polymer (VDF) of at least 1 wt. %, more preferably of at least 3 wt. %, even more preferably of at least 5 wt. %, based on the total weight of medium (L), polymer (N-ZW) and polymer (VDF), and/or composition ($C^L$) preferably comprises an overall amount of polymer (N-ZW) and polymer (VDF) of at most 60 wt. %, more preferably of at most 50 wt. %, even more preferably at most 30 wt. %, based on the total weight of medium (L), polymer (N-ZW) and polymer (VDF) and/or composition ($C^L$).

Conversely, the amount of medium (L) in composition ($C^L$) is of at least 40 wt. %, preferably at least 50 wt. %, even more preferably at least 70 wt. %, based on the total weight of medium (L), polymer (N-ZW) and polymer (VDF), and/or the amount of medium (L) in composition ($C^L$) is of at most 99 wt. %, preferably at most 97 wt. %, even more preferably at most 95 wt. %, based on the total weight of medium (L), polymer (N-ZW) and polymer (VDF).

Composition ($C^L$) may optionally comprise at least one further ingredient. Said further ingredient is preferably selected in the group consisting of pore forming agents, nucleating agents, fillers, salts, surfactants.

When used, pore forming agents are typically added to the composition ($C^L$) in amounts usually ranging from 0.1% to 30% by weight, preferably from 0.5% to 20% by weight, based on the total weight of the composition ($C^L$). Suitable pore forming agents are for instance polyvinyl alcohol (PVA), cellulose acetate, polyvinyl-pyrrolidone (PVP) and polyethyleneglycol (PEG).

Method of Making Porous Membrane

A second aspect of the invention relates to a method for manufacturing a porous membrane, said method comprising:

step (i): preparing a composition (C) as defined above;
step (ii): processing the composition provided in step (i) thereby providing a film; and,
step (iii): processing the film provided in step (ii), generally including contacting the film with a non-solvent medium [medium (NS)], thereby providing a porous membrane.

Porous membranes can be prepared by solvent free method combining in step (ii) processing by melt extrusion of a composition (C) and in step (iii) (salt) leaching via contacting the film with an extractant media, optionally stretching the films during the leaching or after and thereby providing a porous membrane either in the form of flat films or hollow fibers.

Under step (i), composition (C) is prepared by mixing the polymer in the melt in the presence of a salt or a pore forming agent.

Typically porous membrane can be obtained from continuous extrusion of composition (C) prepared by mixing the polymer in the melt in the presence of a salt followed by salt leaching using e.g. immersion in hot water.

Depending on the nature of the extrusion die (flat die, tubular die, spinneret . . . ) and of the processing conditions this solvent free method can be used to prepare flat, tubular, hollow fiber and capillary fiber membranes.

According to a first embodiment, under step (ii), composition (C) is typically processed by casting thereby providing a film.

According to a second embodiment of step (ii), composition (C) is processed by casting to provide a tubular film.

As said, in some embodiments, composition (C) further comprises at least one liquid medium [medium (L)] comprising at least one organic solvent [composition ($C^L$)]. Generally, in composition ($C^L$), medium (L) comprises at least one solvent (S) for polymer (VDF).

Thus in some embodiments, the method for manufacturing a porous membrane, comprises:
- step (i): preparing a composition ($C^L$) as defined above;
- step (ii): processing the composition provided in step (i) thereby providing a film; and,
- step (iii): processing the film provided in step (ii), generally including contacting the film with a non-solvent medium [medium (NS)], thereby providing a porous membrane.

Under step (i), composition ($C^L$) is manufactured by any conventional techniques. For instance, medium (L) may be added to polymer (VDF) and polymer (N-ZW), or, preferably, polymer (VDF) and polymer (N-ZW) are added to medium (L), or even polymer (VDF), polymer (N-ZW) and medium (L) are simultaneously mixed.

Any suitable mixing equipment may be used. Preferably, the mixing equipment is selected to reduce the amount of air entrapped in composition ($C^L$) which may cause defects in the final membrane. The mixing of polymer (VDF), polymer (N-ZW) and the medium (L) may be conveniently carried out in a sealed container, optionally held under an inert atmosphere. Inert atmosphere, and more precisely nitrogen atmosphere has been found particularly advantageous for the manufacture of composition ($C^L$).

Under step (i), the mixing time and stirring rate required to obtain a clear homogeneous composition ($C^L$) can vary widely depending upon the rate of dissolution of the components, the temperature, the efficiency of the mixing apparatus, the viscosity of composition ($C^L$) and the like.

Under step (ii) of the process of the invention, conventional techniques can be used for processing the composition ($C^L$) for providing a film.

Under step (ii), composition ($C^L$) is typically processed by casting thereby providing a film.

Casting generally involves solution casting, wherein typically a casting knife, a draw-down bar or a slot die is used to spread an even film of composition ($C^L$) across a suitable support.

Under step (ii), the temperature at which composition ($C^L$) is processed by casting may be or may be not the same as the temperature at which composition ($C^L$) is mixed under stirring.

Different casting techniques are used depending on the final form of the membrane to be manufactured.

When the final product is a flat membrane, composition ($C^L$) is cast as a film over a flat supporting substrate, typically a plate, a belt or a fabric, or another microporous supporting membrane, typically by means of a casting knife, a draw-down bar or a slot die.

According to a first embodiment of step (ii), composition ($C^L$) is processed by casting onto a flat supporting substrate to provide a flat film.

According to a second embodiment of step (ii), composition ($C^L$) is processed by casting to provide a tubular film.

According to a variant of this second embodiment of the invention, the tubular film is manufactured using a spinneret, this technique being otherwise generally referred as "spinning method". Hollow fibers and capillary membranes may be manufactured according to the spinning method.

The term "spinneret" is hereby understood to mean an annular nozzle comprising at least two concentric capillaries: a first outer capillary for the passage of composition ($C^L$) and a second inner (generally referred to as "lumen") for the passage of a supporting fluid, also referred to as "bore fluid".

According to this variant of the second embodiment, composition ($C^L$) is generally pumped through the spinneret, together with at least one supporting fluid (so called "bore fluid"). The supporting fluid acts as the support for the casting of the composition ($C^L$) and maintains the bore of the hollow fiber or capillary precursor open. The supporting fluid may be a gas, or, preferably, a non-solvent medium [medium (NS)] or a mixture of the medium (NS) with a medium (L). The selection of the supporting fluid and its temperature depends on the required characteristics of the final membrane as they may have a significant effect on the size and distribution of the pores in the membrane.

Step (iii) generally includes a step of contacting the film provided in step (ii) with a non-solvent medium [medium (NS)] thereby providing a porous membrane.

Such step of contacting with a medium (NS) is generally effective for precipitating and coagulating the composition ($C^L$) constituting the film of step (ii) into a porous membrane.

The film may be precipitated in said medium (NS) by immersion in a medium (NS) bath, which is often referred to as a coagulation bath.

As an alternative (or usually before immersing in a coagulation bath), contacting the film with the medium (NS) can be accomplished by exposing the said film to a gaseous phase comprising vapours of said medium (NS).

Typically, a gaseous phase is prepared e.g. by at least partial saturation with vapours of medium (NS), and the said film is exposed to said gaseous phase. For instance, air possessing a relative humidity of higher than 10%, generally higher than 50% (i.e. comprising water vapour) can be used.

Prior to be being contacted with the non-solvent medium (by whichever technique as explained above), the film may be exposed during a given residence time to air and/or to a controlled atmosphere, in substantial absence of said medium (NS). Such additional step may be beneficial for creating a skin on the exposed surface of the film through alternative mechanisms.

For instance, in the spinning method, this may be accomplished by imposing an air-gap in the path that the spinned hollow tubular precursor follows before being driven into a coagulation bath.

According to certain embodiment's, in step (iii), coagulation/precipitation of the composition ($C^L$) may be promoted by cooling. In this case, the cooling of the film provided in step (ii) can be typically using any conventional techniques.

Generally, when the coagulation/precipitation is thermally induced, the solvent (S) of medium (L) of composition ($C^L$) is advantageously a "latent" solvent [solvent (LT)], i.e. a solvent which behaves as an active solvent towards polymer (VDF) only when heated above a certain temperature, and which is not able to solubilize the polymer (VDF) below the said temperature.

When medium (L) comprises a latent solvent or solvent (LT), step (i) and step (ii) of the method of the invention are generally carried out at a temperature high enough to maintain composition ($C^L$) as a homogeneous solution.

For instance, under step (ii), according to this embodiment, the film may be typically processed at a temperature comprised between 60° C. and 250° C., preferably between 70° C. and 220°, more preferably between 80° C. and 200° C., and under step (iii), the film may be typically precipitated by cooling to a temperature below 100° C., preferably below 60° C., more preferably below 40° C.

Cooling may be achieved by contacting the film provided in step (ii) with a cooling fluid, which may be a gaseous fluid (i.e. cooled air or cooled modified atmosphere) or may be a liquid fluid.

In this latter case, it is usual to make use of a medium (NS) as above detailed, so that the phenomena of non solvent-induced and thermally-induced precipitation may simultaneously occur.

It is nevertheless generally understood that even in circumstances whereas the precipitation is induced thermally, a further step of contacting with a medium (NS) is carried out, e.g. for finalizing precipitation and facilitating removal of medium (L).

In cases whereas the medium (L) comprises both a solvent (S) and a non-solvent for polymer (VDF), at least partially selective evaporation of solvent (S) may be used for promoting coagulation/precipitation of polymer (VDF). In this case, solvent (S) and non-solvent components of medium (L) are typically selected so as to ensure solvent (S) having higher volatility than non-solvent, so that progressive evaporation, generally under controlled conditions, of the solvent (S) leads to polymer (VDF) precipitation, and hence actual contact of the film with the medium (NS).

When present in composition ($C^L$), pore forming agents are generally at least partially, if not completely, removed from the porous membrane in the medium (NS), in step (iii) of the method of the invention.

In all these approaches, it is generally understood that the temperature gradient during steps (ii) and (iii), the nature of medium (NS) and medium (L), including the presence of non-solvent in medium (L) are all parameters known to one of ordinary skills in the art for controlling the morphology of the final porous membrane including its average porosity.

The method of the invention may include additional post treatment steps, for instance steps of rinsing and/or stretching the porous membrane and/or a step of drying the same.

For instance, the porous membrane may be additionally rinsed using a liquid medium miscible with the medium (L).

Further, the porous membrane may be advantageously stretched so as to increase its average porosity.

Generally, the porous membrane is dried at a temperature of advantageously at least 30° C.

Drying can be performed under air or a modified atmosphere, e.g. under an inert gas, typically exempt from moisture (water vapour content of less than 0.001% v/v). Drying can alternatively be performed under vacuum.

For the purpose of the present invention, by the term "non-solvent medium [medium (NS)]" it is meant a medium consisting of one or more liquid substances incapable of dissolving the polymer (VDF) of composition (C) or ($C^L$), and which advantageously promotes the coagulation/precipitation of polymer (VDF) from liquid medium of composition ($C^L$).

The medium (NS) typically comprises water and, optionally, at least one organic solvent selected from alcohols or polyalcohols, preferably aliphatic alcohols having a short chain, for example from 1 to 6 carbon atoms, more preferably methanol, ethanol, isopropanol and ethylene glycol.

The medium (NS) is generally selected among those miscible with the medium (L) used for the preparation of composition ($C^L$).

The medium (NS) may further comprise a solvent (S), as above detailed.

More preferably, the medium (NS) consists of water. Water is the most inexpensive non-solvent medium and can be used in large amounts.

Porous Membranes

A third aspect of the invention relates to a porous membrane comprising:
- at least one vinylidene fluoride polymer [polymer (VDF)], and
- at least one polymer [polymer (N-ZW)] comprising zwitterionic recurring units derived from at least one ethylenically unsaturated monomer having at least two ionic groups, at least one of them being a cationic group [group (C+)] and at least one of them being an anionic group [group (A–)], and further comprising at least one hydroxyl group [units ($R_{ZW}$)].

The expression "porous membrane" is used according to its usual meaning in this technical field, i.e. to denote membrane including pores, i.e. voids or cavity of any shape and size.

As said, the porous membrane of the invention is obtainable from the compositions (C) or ($C^L$) as detailed above and/or manufactured using the method as above detailed.

The porous membrane of the invention may be in the form of flat membranes or in the form of tubular membranes.

Flat membranes are generally preferred when high fluxes are required whereas hollow fibers membranes are particularly advantageous in applications wherein compact modules having high surface areas are required.

Flat membranes preferably have a thickness comprised between 10 µm and 200 µm, more preferably between 15 µm and 150 µm.

Tubular membranes typically have an outer diameter greater than 3 mm. Tubular membranes having an outer diameter comprised between 0.5 mm and 3 mm are typically referred to as hollow fibers membranes. Tubular membranes having a diameter of less than 0.5 mm are typically referred to as capillary membranes.

Membranes containing pores homogeneously distributed throughout their thickness are generally known as symmetric (or isotropic) membranes; membranes containing pores which are heterogeneously distributed throughout their thickness are generally known as asymmetric (or anisotropic) membranes.

The porous membrane according to the present invention may be either a symmetric membrane or an asymmetric membrane.

The asymmetric porous membrane typically consists of one or more layers containing pores which are heterogeneously distributed throughout their thickness.

The asymmetric porous membrane typically comprises an outer layer containing pores having an average pore diameter smaller than the average pore diameter of the pores in one or more inner layers.

The porous membrane of the invention preferably has an average pore diameter of at least 0.001 µm, more preferably of at least 0.005 µm, and even more preferably of at least 0.01 µm. The porous membrane of the invention preferably has an average pore diameter of at most 50 µm, more preferably of at most 20 µm and even more preferably of at most 15 µm.

[Suitable techniques for the determination of the average pore diameter in the porous membranes of the invention are described for instance in Handbook of Industrial Membrane Technology. Edited by PORTER. Mark C. Noyes Publications, 1990. p. 70-78.

The porous membrane of the invention typically has a gravimetric porosity comprised between 5% and 90%, preferably between 10% and 85% by volume, more preferably between 30% and 90%, based on the total volume of the membrane.

For the purpose of the present invention, the term "gravimetric porosity" is intended to denote the fraction of voids over the total volume of the porous membrane.

Suitable techniques for the determination of the gravimetric porosity in the porous membranes of the invention are described for instance in SMOLDERS K., et al. Terminology for membrane distillation. Desalination. 1989, vol. 72, p. 249-262.

The porous membrane of the invention may be either a self-standing porous membrane or a porous membrane supported onto a substrate and/or comprising a backing layer.

The porous membrane comprises at least one layer comprising at least one polymer (VDF) and at least one polymer (N-ZW).

A porous membrane supported onto a substrate is typically obtainable by laminating said substrate and/or backing with a pre-formed porous membrane or by manufacturing the porous membrane directly onto said substrate and/or said backing.

Hence, porous membrane may be composed of one sole layer comprising polymer (VDF) and polymer (N-ZW) or may comprise additional layers.

In particular, the porous membrane of the invention may further comprise at least one substrate. The substrate may be partially or fully interpenetrated by the porous membrane of the invention.

The nature of the substrate/backing is not particularly limited. The substrate generally consists of materials having a minimal influence on the selectivity of the porous membrane. The substrate layer preferably consists of non-woven materials, polymeric material such as for example polypropylene, glass, glass fibers.

In some embodiments, the porous membrane of the invention is a porous composite membrane assembly comprising:
at least one substrate layer, preferably a non-woven substrate,
at least one top layer, and
between said at least one substrate layer and said at least one top layer, at least one layer comprising at least one polymer (VDF) and at least one polymer (N-ZW).

Typical examples of such porous composite membrane assembly are the so called Thin Film Composite (TFC) structures which are typically used in reverse osmosis or nanofiltration applications.

Non limiting examples of top layers suitable for use in the porous composite membrane assemblies of the invention include those made of polymers selected from the group consisting of polyamides, polyimides, polyacrylonitriles, polybenzimidazoles, cellulose acetates and polyolefins.

Porous membrane layers comprising polymer (VDF) and polymer (N-ZW) may additionally comprise one or more than one additional ingredients. Nevertheless, embodiment's whereas porous membrane comprises at least one layer consisting essentially of polymer (VDF) and polymer (N-ZW) are preferred, being understood that additives, and/or residues of pore forming agents may be present, in amounts not exceeding 10 wt. % of the said layer.

In the porous membrane, polymer (N-ZW) is used as an additive for polymer (VDF), so it is generally understood that polymer (VDF) is present in predominant amount over polymer (N-ZW). Generally, the weight ratio polymer (N-ZW)/polymer (VDF) is of at least 1/99 wt/wt, preferably at least 3/97 wt/wt, more preferably at least 5/95 wt/wt and/or it is less than 50/50 wt/wt, preferably less than 40/60 wt/wt, preferably less than 30/70 wt/wt.

Method of Separating an Aqueous Medium

A fourth aspect of the invention relates to a method of separating an aqueous medium, said method comprising contacting said aqueous medium with the porous membrane as described above.

All features above described in connection with the porous membrane of the invention are applicable in connection to the use thereof in the method hereby described.

Depending on its average pore diameter, the porous membrane of the invention has different uses, and can be applied to a variety of separation processes, e.g. microfiltration, ultrafiltration, reverses osmosis, which substantially differ in connection with the size of the "rejected"/refused entities, which may be of whichever nature.

The expression 'aqueous medium" is not particularly limited, and encompasses all media including water, including biological fluids, natural fluids or synthetic mixtures.

The method of separating an aqueous medium of the invention may be applied notably to desalination of brackish and sea water, waste water treatment/reclamation, may be used in the food industry, and may be finalized to the separation and purification of chemical and biological products.

According to certain embodiments, the aqueous phase may be notably a water-based phase comprising one or more contaminants.

The aqueous phase may be a particulate suspension of contaminants, i.e. a suspension comprising chemical or physical pollutants (e.g. inorganic particles such as sand, grit, metal particles, ceramics; organic solids, such as polymers, paper fibers, vegetals' and animals' residues; biological pollutants such as bacteria, viruses, protozoa, parasites).

The separation method of the invention can be used for filtrating biologic solutions (e.g. bioburden, virus, other large molecules) and/or buffer solutions (e.g. solutions that may contain small amount of solvents like DMSO or other polar aprotic solvents).

For instance, the separation method of the invention may be a method for purifying biological fluids, such as notably blood, notably in an extracorporeal blood circuit or a dialysis filter. In this case, the used porous membrane generally possesses an average pore diameter of from 0.001 to 5 μm and can be in the form of tubular or hollow fiber membrane.

Otherwise, the separation method of the invention may be notably a method for filtrating water suspensions from suspended particulates; in this case, the used porous membrane generally possesses an average pore diameter of from 5 μm to 50 μm.

The invention will be now be described in connection with the following examples, whose scope is merely illustrative and not intended to limit the scope of the invention.

Copolymer Particularly Suitable

A fifth aspect of the invention relates to a copolymer (N-ZW) comprising zwitterionic recurring units ($R_{ZW}$) derived from 3-((3-acrylamidopropyl)dimethylammonio)-2-hydroxypropane-1-sulfonate (AHPS) and recurring units ($R_N$) derived from at least one monomer selected from the list consisting of alkyl (meth)acrylates, vinyl acetate and N, N-dimethyl acrylamide. Said copolymer is suitable to be used in composition (C) for manufacturing a membrane as described above by the method as described above.

In preferred embodiments the copolymer (N-ZW) comprises zwitterionic recurring units ($R_{ZW}$) derived from 3-((3-acrylamidopropyl)dimethylammonio)-2-hydroxypropane-1-sulfonate (AHPS) and recurring units ($R_N$) derived from methyl methacrylate.

Said copolymer is particularly suitable to be used in composition (C) for manufacturing a membrane as described above by the method as described above.

In some other embodiments the copolymer as previously described further comprises recurring units derived from at least one monomer selected from the list consisting of 2-hydroxyethyl methacrylate (HEMA), hydroxypropyl methacrylate, 2-hydroxyethyl acrylate (HEA), hydroxypropyl acrylate, 4-hydroxybutyl acrylate, poly(ethylene glycol) methacrylate (PEGMA), poly(ethylene glycol) methyl ether methacrylate (mPEGMA), poly(ethylene glycol) ethyl ether methacrylate, poly(ethylene glycol) methyl ether acrylate and poly(ethylene glycol) ethyl ether acrylate.

In some preferred embodiments the copolymer of the invention comprises recurring units derived from methyl methacrylate, recurring units derived from 3-((3-acrylamidopropyl)dimethylammonio)-2-hydroxypropane-1-sulfonate (AHPS), and recurring units derived from 2-hydroxyethyl methacrylate (HEMA).

Experimental

Raw Materials

PVDF SOLEF® 1015 provided by Solvay Specialty Polymers was used as VDF homopolymer.

The following solvents reactants and solvents were obtained from Sigma Aldrich; and used as received: N-[3-(dimethylamino) propyl] acrylamide (DMAPA), 3-chloro-2-hydroxy-1-propane sulfonic acid, sodium salt (CHPSNa), 2,2'-Azobis(2-methylbutyronitrile) (AMBN), methyl methacrylate (MMA), 3-((2-(methacryloyloxy)ethyl)dimethylammonio)propane-1-sulfonate (SPE), dimethylsulfoxide (DMSO) and N-methyl-2-pyrrolidone (NMP).

Molar Mass Determination

Gel permeation chromatography was performed at 40° C. using a Jasco PU-2080 Plus HPLC pump equipped with 2 SHODEX KD-804 columns and a Jasco Refractive index-4030 detector. The mobile phase was composed of 1.5% LiBr in DMF and the flow rate was of 1.0 mL/min. 100 μL samples (concentration of approximatively 5.0 mg/mL) were injected, calibration was obtained with PMMA narrow standards. $M_w$ is weight-average molar mass, expressed in g/mol.

EXAMPLES

Synthesis of 3-((3-acrylamidopropyl)dimethylammonio)-2-hydroxypropane-1-sulfonate (AHPS)

AHPS was synthesized according to the following scheme

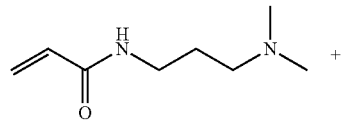

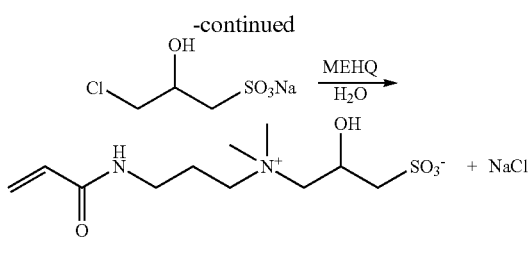

The synthesis was performed by reacting N-[3-(dimethylamino) propyl]acrylamide (DMAPA) and 3-chloro-2-hydroxy-1-propane sulfonic acid, sodium salt (CHPSNa) in 50% water in the presence of hydroquinone monomethyl ether (MEHQ) to inhibit polymerization.

In a four necked round bottom flask equipped with mechanical stirring, temperature control and reflux condenser were added 60 g of water and 0.02 g (mmol) of MEHQ under stirring. Then 43.53 g (221 mmol) of crystal solid CHPSNa were added via a powder funnel and the temperature was raised up to 60° C. Liquid DMAPA was then added in a steady stream over 20 min. resulting in a maximum temperature of 76° C. The reaction mixture was finally heated to 90° C. and maintained at this temperature during 4 hours while keeping the pH to 10 by adding sodium hydroxide solution 50 wt % in water when necessary (typically 0.14 g). Conversion was followed by HPLC and the product structure was confirmed by $^1H$ and $^{13}C$ NMR.

Synthesis of Poly(MMA-Stat-AHPS) 95/5 Mol/Mol

Statistical copolymer poly(methyl methacrylate-stat-3-((3-acrylamidopropyl)dimethylammonio)-2-hydroxypropane-1-sulfonate was prepared by free radical polymerization using 2,2'-Azobis(2-methylbutyronitrile) (AMBN) as the initiator.—MMA=95 mol %—AHPS=5 mol %)

In a 500 mL kettle reactor equipped with a water condenser and a mechanical agitation, were introduced, at room temperature (22° C.), 7.5 g (18.73 mmol) of a methyl methacrylate (MMA) solution (25 wt % in DMSO), 88.3 g of dimethyl sulfoxide (DMSO, at 99% purity) and 5.80 g (9.86 mmol) of a solution of 3-((3-acrylamidopropyl)dimethylammonio)-2-hydroxypropane-1-sulfonate in water (AHPS content 50.0 wt %). The mixture was degassed by nitrogen bubbling for 50 minutes while the temperature of the reaction medium was raised up to 70° C. 15.16 g (1.5 mmol) of an AMBN solution (2% in DMSO) were further introduced under a nitrogen blanket. Then, 67.5 g (168.57 mmol) of MMA solution were added within 4 hours (flow rate of 0.28 g/min) and the reaction medium was let stirred for further 8 hours at 70° C.

Afterwards, a sample was taken for $^1H$ NMR analysis to determine the MMA and AHPS conversions.

Results: MMA monomer conversion=99.9%; AHPS monomer conversion=84.4%.

$M_w$=37200 g/mol

Synthesis of Poly(MMA-Stat-SPE) 95/5 Mol/Mol

In a 500 mL kettle reactor equipped with a water condenser and a mechanical agitation, were introduced, at room temperature (22° C.), 75 g (187.30 mmol) of a methyl methacrylate (MMA) solution (25 wt % in DMSO), 92.5 g of dimethyl sulfoxide (DMSO, at 99% purity) and 55.1 g (9.5 mmol) of a solution of 3-((2-(methacryloyloxy)ethyl)dimethylammonio)propane-1-sulfonate (SPE) (5% in DMSO). The mixture was degassed by nitrogen bubbling for 50 minutes while the temperature of the reaction medium was raised up to 70° C. Then 15.16 g (1.5 mmol) of an AMBN solution (2% in DMSO) were introduced under a nitrogen blanket. The reaction was conducted for 10 hours at 70° C. under stirring.

Afterwards, a sample was taken for $^1$H NMR analysis to determine the MMA and SPE conversions. Results: MMA monomer conversion=98.1%; SPE monomer conversion=94.1%.

$M_w$=69000 g/mol

Preparation of Membranes Containing Zwitterionic Additive

Membranes were cast from dope solutions containing blends of PVDF SOLEF® 1015 and of the synthesized zwitterionic p(MMA-s-SPE) or (MMA-s-AHPS) copolymers in dimethyl sulfoxide (DMSO) or N-methyl-2-pyrrolidone (NMP) and immersed in a coagulation bath in order to induce phase separation (NIPS for non-solvent induced phase separation).

General Method for Preparing Dope Solutions

To prepare the dope solutions, the zwitterionic additive was dissolved in NMP at approximately 65° C. and PVDF was added. The resulting mixture was then stirred overnight at 65° C. Several zwitterionic copolymer:PVDF ratios were fixed at 5/95, 10/90, and 20/80 wt/wt., totaling a 0.5 g total polymer in 4.5 g of solvent.

The dope solutions were degassed in a vacuum oven set at 40° C. for 24 h. The dope solutions were casted on a glass plate using an adjustable film applicator set to a 200 µm gate size and polymer blend precipitated out by immersion into a DI water bath at room temperature for 20 min. After this period, the resulting membranes were moved to a fresh DI water bath and stored at least overnight before use. As a control, additive-free PVDF membrane was manufactured by dissolving 0.5 g PVDF in 4.5 g NMP and following the NIPS procedure explained above.

Hydrophilicity Evaluation by Contact Angle Measurement

Surface hydrophilicity is generally assessed by Water Contact Angle (WCA), i.e. by evaluating the contact angle of a water droplet at a sample's surface. Because of absorption phenomena, this method is poorly suited to measure contact angles of porous hydrophilic samples, consequently contact angles were measured by the Captive Air Bubble (CAB) method. Indeed, this method measures the contact angle of an air bubble at a surface immersed in a liquid, in this case water and, as the membranes are already wet, swelling and absorption are suppressed.

Theoretically the Air Contact Angle (ACA) and WCA are complementary, meaning that increasing ACA corresponds to increasing hydrophilicity.

WCA(°)=180−ACA(°).

The principle of the CAB method is illustrated in the FIG. 1.

Air Contact Angle (ACA) measurements were carried out at room temperature, using an adapted environment controlled chamber filled with de-ionised water (1) (DI water). Prior to analysis, the wet samples (2) were wrapped on a 15×15 mm glass substrate, fixed on a sample holder (3) with double-sided tape. Samples were then immersed in DI water, and a 2 µL air bubble (4) was dropped on the sample surface using a J-shaped syringe (5).

Contact Angle measurements were performed on an optical tensiometer (Attension® Theta Flex provided by BIOLIN) equipped with a high quality monochromatic cold LED (6) and a high resolution (1984×1264) digital camera (7). Image acquisition parameters were set at 5 Frames Per Second (FPS) and a minimum acquisition time of 60 s. The instrument was calibrated using a calibration ball (CA=143.15°) with an accepted error of 0.03°.

Obtained contact angle values are the average of 5 measurements performed on the same sample. Error bars represent Standard Deviation (Std) between measurements with addition of standard deviation during measurements.

Chemical Aging of Membranes

With Sodium Hydroxide (NaOH)

Membranes (sample size around 2×2 cm) were soaked in 20 mL of a sodium hydroxide (NaOH) solution at pH=11.5 (0.003 mol/L) for one week at room temperature. No stirring was applied.

With Sodium Hypochlorite (NaOCl)

Membranes (sample size around 2×2 cm) were soaked in 20 mL of a sodium hypochlorite (NaOCl) solution at a concentration of 5000 ppm and pH=8 for one week, at room temperature. No stirring was applied. The solution of NaOCl was prepared by dilution of a 5% active chlorine commercial solution, and the pH was adjusted to 8 by the addition of hydrochloric acid HCl. Aging was performed in the dark and the aging solution was replaced at least every 2 days.

Results

As previously mentioned, an increase of air contact angle (ACA) corresponds to an increase of hydrophilicity for given membranes.

In the tables below are compiled the values of ACA measured for PVDF membranes containing or not copolymer additive and for PVDF membranes having or not being aged in NaOH or NaOCl. Table 1 contains results about membranes casted from NMP containing dope solutions.

TABLE 1 air contact angle (ACA °) measured from membranes casted from NMP dope solutions

| Membrane | Membrane composition (wt./wt.) | Additive composition (mol/mol) | Non aged membrane ACA (°) | Membrane aged in NaOH ACA (°) | Membrane aged in NaOCl ACA (°) |
|---|---|---|---|---|---|
| 0 | Solef® 1015 (100/0) | — | 124 ± 4 | 113 ± 7 | 113 ± 6 |
| 1 | Solef® 1015 p(MMA-s-SPE) (95/5) | MMA/SPE (95/5) | n.d. | n.d. | 135 ± 15 |
| 2 | Solef® 1015 p(MMA-s-SPE) (90/10) | MMA/SPE (95/5) | 142 ± 10 | 140 ± 12 | 129 ± 12 |
| 3 | Solef® 1015 p(MMA-s-SPE) (80/20) | MMA/SPE (95/5) | 160 ± 7 | 156 ± 7 | 160 ± 5 |

TABLE 1-continued air contact angle (ACA °) measured from
membranes casted from NMP dope solutions

| Membrane | Membrane composition (wt./wt.) | Additive composition (mol/mol) | Non aged membrane ACA (°) | Membrane aged in NaOH ACA (°) | Membrane aged in NaOCl ACA (°) |
|---|---|---|---|---|---|
| 4 | Solef® 1015 p(MMA-s-AHPS) (95/5) | MMA/AHPS (95/5) | 163 ± 5 | 149 ± 11 | 140 ± 12 |
| 5 | Solef® 1015 p(MMA-s-AHPS) (90/10) | MMA/AHPS (95/5) | 157 ± 7 | 149 ± 13 | 156 ± 8 |
| 6 | Solef® 1015 p(MMA-s-AHPS) (80/20) | MMA/AHPS (95/5) | 154 ± 6 | 160 ± 7 | 159 ± 6 |

It can be seen in table 1 that, the influence of the additive on the hydrophilization of the PVDF membrane is clearly demonstrated when comparing the ACA value measured on membrane free of any additive (membrane 0) which is lower than the ACA value of any membrane containing any additive (membranes 1 to 6).

Moreover, results of table 1 show that aging of the membranes in NaOH or NaOCl is not detrimental to the hydrophilization of the PVDF membranes containing additives. Indeed, ACA value measured on any membrane containing any additive beforehand aged in NaOH or NaOCl is still higher than ACA value measured on membrane free of additive after aging in similar conditions.

For a composition PVDF/additive of low additive content i.e. 95/5, the presence of AHPS in the additive allows surprisingly to reach ACA value of 163° (see membrane 4). For obtaining a similar ACA value i.e. 160° with the additive comprising SPE, a composition PVDF/additive of higher additive content i.e. 80/20 is required (compare membrane 3 with membrane 4).

From the results of table 1, it is clear that hydrophilization capability of the the resulting copolymer additive is enhanced when changing the zwitterionic monomer involved in the copolymerization with MMA from SPE to AHPS.

In other terms, high hydrophilization of PVDF based membrane can be obtain with less additive when adding an additive comprising zwitterionic recurring units further comprising an hydroxyl group than when adding similar additive comprising zwitterionic recurring units which does not comprise any hydroxyl group.

A good hydrophilization of PVDF based membranes can be reached with less additive, thus avoiding detrimental effect du to the presence in too large amount of said additive on the mechanical, thermal and chemical resistance of the porous PVDF membrane.

The invention claimed is:

1. A composition (composition (C)) comprising:
   at least one vinylidene fluoride (VDF) polymer (polymer (VDF)), and
   at least one polymer (polymer (N-ZW)) comprising zwitterionic recurring units derived from at least one ethylenically unsaturated monomer having at least two ionic groups, at least one of them being a cationic group (group (C+)) and at least one of them being an anionic group (group (A−)), and further comprising at least one hydroxyl group (units ($R_{ZW}$)).

2. The composition (C) according to claim 1, wherein polymer (VDF) is selected from the group consisting of polymers comprising recurring units derived from VDF and, optionally, recurring units derived from at least one ethylenically unsaturated monomer comprising fluorine atom(s) different from VDF, which is selected from the group consisting of:
   (a) $C_2$-$C_8$ perfluoroolefins;
   (b) hydrogen-containing $C_2$-$C_8$ fluoroolefins different from VDF, perfluoroalkyl ethylenes of formula $CH_2$=$CH$—$R_{f1}$, wherein $R_{f1}$ is a $C_1$-$C_6$ perfluoroalkyl group;
   (c) $C_2$-$C_8$ chloro- and/or bromo-containing fluoroolefins;
   (d) perfluoroalkylvinylethers (PAVE) of formula $CF_2$=$CFOR_{f1}$, wherein $R_{f1}$ is a $C_1$-$C_6$ perfluoroalkyl group;
   (e) perfluorooxyalkylvinylethers of formula $CF_2$=$CFOX_0$, wherein $X_0$ is a $C_1$-$C_{12}$ perfluorooxyalkyl group comprising one or more than one ethereal oxygen atom; and
   (f) (per)fluorodioxoles of formula:

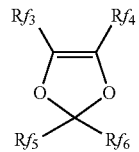

wherein each of $R_{f3}$, $R_{f4}$, $R_{f5}$ and $R_{f6}$, equal to or different from each other, is independently a fluorine atom, a $C_1$-$C_6$ perfluoro(oxy)alkyl group, optionally comprising one or more oxygen atoms.

3. The composition (C) of claim 2, wherein polymer (VDF) is a polymer comprising:
   (a') at least 60% by moles of recurring units derived from vinylidene fluoride (VDF);
   (b') optionally from 0.1 to 30% by moles of recurring units derived from a fluorinated monomer different from VDF; and
   (c') optionally from 0.1 to 10%, by moles of recurring units derived from one or more hydrogenated monomer(s),
   all aforementioned % by moles being referred to total moles of recurring units of the polymer (VDF).

4. The composition (C) according to claim 1, wherein units ($R_{ZW}$) are derived from at least one monomer selected from the list consisting of
   a) hydroxyalkyl sulfonates or phosphonates of dialkylammonium alkyl acrylates or methacrylates, acrylamido or methacrylamido;

b) heterocyclic betaine monomers comprising at least one hydroxyl group, and
c) hydroxyalkyl sulfonates or phosphonates of dialkylammonium alkyl styrenes.

5. The composition (C) according to claim 1, wherein polymer (N-ZW) further comprises recurring units different from units ($R_{ZW}$), derived from at least one ethylenically unsaturated monomer deprived of ionisable groups (units ($R_N$)).

6. The composition (C) according to claim 5, wherein units ($R_N$) are derived from
at least one monomer selected from a list consisting of methyl methacrylate, ethyl methacrylate, butyl methacrylate, methyl acrylate, ethyl acrylate, butyl acrylate, vinyl acetate and N,N-dimethylacrylamide (units ($R_{N-1}$));
at least one monomer selected from the list consisting of 2-hydroxyethyl methacrylate (HEMA), hydroxypropyl methacrylate, 2-hydroxyethyl acrylate (HEA), hydroxypropyl acrylate, 4-hydroxybutyl acrylate, poly(ethylene glycol) methacrylate (PEGMA), poly(ethylene glycol) methyl ether methacrylate (mPEGMA), poly(ethylene glycol) ethyl ether methacrylate, poly(ethylene glycol) methyl ether acrylate and poly(ethylene glycol) ethyl ether acrylate (units ($R_{N-2}$));
at least one monomer selected from the list consisting of methyl methacrylate, ethyl methacrylate, butyl methacrylate, methyl acrylate, ethyl acrylate, butyl acrylate, vinyl acetate and N,N-dimethylacrylamide (units ($R_{N-1}$)) and at least one monomer selected from the list consisting of 2-hydroxyethyl methacrylate (HEMA), hydroxypropyl methacrylate, 2-hydroxyethyl acrylate (HEA), hydroxypropyl acrylate, 4-hydroxybutyl acrylate, poly(ethylene glycol) methacrylate (PEGMA), poly(ethylene glycol) methyl ether methacrylate (mPEGMA), poly(ethylene glycol) ethyl ether methacrylate, poly(ethylene glycol) methyl ether acrylate and poly(ethylene glycol) ethyl ether acrylate (units ($R_{N-2}$)).

7. The composition (C) according to claim 5, wherein polymer (N-ZW) comprises from 0.1 to 30% by moles of units ($R_{ZW}$), with respect to total moles of recurring units of polymer (N-ZW).

8. The composition (C) according to claim 5, wherein polymer (N-ZW) comprises 70% or more by moles of units ($R_N$), with respect to total moles of recurring units of polymer (N-ZW).

9. The composition (C) according to claim 6, wherein polymer (N-ZW) comprises recurring units ($R_{N-1}$) and comprises from 0.1 to 50% by moles of recurring units ($R_{ZW}$) and ($R_{N-2}$), with respect to total moles of recurring units of polymer (N-ZW).

10. The composition (C) according to claim 1, wherein polymer (VDF) is present in predominant amount over polymer (N-ZW) in composition (C), and weight ratio polymer (N-ZW)/polymer (VDF) is of at least 1/99 wt./wt., and/or it is less than 50/50 wt./wt.

11. The composition (C) according to claim 1, which further comprises at least one liquid medium (medium (L)) comprising at least one organic solvent (composition ($C^L$)).

12. The composition (C) according to claim 11, which composition comprises an overall amount of polymer (N-ZW) and polymer (VDF) of at least 1 wt. % based on total weight of medium (L), polymer (N-ZW) and polymer (VDF), and/or composition ($C^L$) comprises an overall amount of polymer (N-ZW) and polymer (VDF) of at most 60 wt. % based on the total weight of medium (L), polymer (N-ZW) and polymer (VDF) and/or composition ($C^L$).

13. A method for manufacturing a porous membrane, said method comprising:
step (i): preparing a composition (C) according to claim 1;
step (ii): processing the composition provided in step (i) thereby providing a film; and,
step (iii): processing the film provided in step (ii), thereby providing a porous membrane.

14. A porous membrane comprising:
at least one vinylidene fluoride polymer (polymer (VDF)), and
at least one polymer (polymer (N-ZW)) comprising zwitterionic recurring units derived from at least one ethylenically unsaturated monomer having at least two ionic groups, at least one of them being a cationic group (group (C+)) and at least one of them being an anionic group (group (A−)), and further comprising at least one hydroxyl group (units ($R_{ZW}$)).

15. A method of separating an aqueous medium, said method comprising contacting said aqueous medium with a porous membrane according to claim 14.

16. A copolymer (N-ZW) comprising zwitterionic recurring units ($R_{ZW}$) derived from 3-((3-acrylamidopropyl)dimethylammonio)-2-hydroxypropane-1-sulfonate (AHPS) and recurring units ($R_N$) derived from at least one monomer selected from the list consisting of alkyl (meth)acrylates, vinyl acetate and N, N-dimethyl acrylamide.

17. The method of claim 13, wherein step (iii) comprises contacting the film with a non-solvent medium (medium (NS)).

* * * * *